US005748331A

United States Patent [19]

Köhler

[11] Patent Number: 5,748,331

[45] Date of Patent: May 5, 1998

[54] PROCESS CONTROL STRIP AND METHOD FOR RECORDING

[75] Inventor: Thomas Köhler, Mücke, Germany

[73] Assignee: Linotype-Hell AG, Eschborn, Germany

[21] Appl. No.: 732,299

[22] PCT Filed: Mar. 2, 1996

[86] PCT No.: PCT/DE96/00363

§ 371 Date: Mar. 6, 1997

§ 102(e) Date: Mar. 6, 1997

[87] PCT Pub. No.: WO96/27821

PCT Pub. Date: Sep. 12, 1996

[30] Foreign Application Priority Data

Mar. 4, 1995 [DE] Germany ........................ 195 07 665.6

[51] Int. Cl.$^6$ .............................. G03B 27/32; B32B 7/02

[52] U.S. Cl. ............................ 358/302; 355/77; 428/212; 358/461

[58] Field of Search ............................... 355/77; 356/446, 356/243; 358/461, 455, 302, 298; 428/212; 430/30

[56] References Cited

U.S. PATENT DOCUMENTS 4,004,923 1/1977 Hensel ...................................... 430/30
4,183,990 1/1980 Uchida .................................... 428/212
4,504,141 3/1985 Yamakoshi ................................ 355/77
4,588,298 5/1986 Nakamura ............................... 356/443

FOREIGN PATENT DOCUMENTS 58-202445 11/1983 Japan .

OTHER PUBLICATIONS

Patent Abstract of Japan—vol. 8, No. 51 P-259, 1488, Mar. 8, 1984.

*Primary Examiner*—Peter S. Wong
*Assistant Examiner*—Gregory J. Toatley, Jr.
*Attorney, Agent, or Firm*—Hill & Simpson

[57] ABSTRACT

A process control strip for visual monitoring of an exposure process for a recording material as course signal elements and fine signal elements. A first stripe extending in a direction of a greatest expanse of the process control strip has a tonal value wedge with process-independent reference tonal values as the course signal elements that change in the stripe direction. A second stripe proceeds parallel to the first stripe and has a raster with fine raster points and the fine signal elements that represent a uniform, highly process-dependent tonal value.

18 Claims, 3 Drawing Sheets

PROCESS CONTROL STRIP AND METHOD FOR RECORDING

BACKGROUND OF THE INVENTION

The invention is in the field of electronic reproduction technology and is directed to a process control strip for visual monitoring and calibration of an exposure process for a recording material, particularly for a printing plate, and is also directed to a method for recording the process control strip.

The point-by-point and line-by-line, rastered exposure of a recording material, for example a film, usually occurs with an electronic recording device, also called an exposer or recorder. For that purpose, image signal values that represent the tonal values to be recorded are supplied to a raster generator in which the image signal values are converted according to a raster function into control signal values for an exposure beam generated in an exposure unit of the exposer. The pixel-by-pixel and line-by-line exposure of the film occurs during a relative motion between the exposure beam and the film to be exposed in that the control signal values turn the exposure beam on and off and thus determine which pixels are exposed as parts of the raster points on the film or are not exposed. The raster function thereby determines the size of the raster points dependent on the tonal values to be recorded.

In the exposure of the film, the real tonal values or, raster point sizes deviate from the desired, nominal tonal values since every pixel and, thus, every raster point is recorded more or less enlarged due to blooming. The deviations between the tonal values that are really generated and the nominal tonal values are referred to as point growths that lead to disturbing changes in tonal value in the reproduction.

The point growths are thereby compensated in the exposer during the film exposure in that the image signal values that represent the nominal tonal values are corrected by what is referred to as a film linearization according to a correction curve determined before the film exposure such that the tonal values really recorded on the film correspond to the nominal tonal values.

After the film exposure, the film exposed in the exposer is developed in a developing station and is used for manufacturing a printing form.

The traditional manufacture of printing plates occurs in two sub-processes. In a first sub-process, a film is exposed with an exposer and the exposed film is developed in a developing station. In a second sub-process, the exposed and developed film, as a master, is copied onto a light-sensitive printing plate in a copier device, whereby slight positive or negative point growths and, thus, falsifications of tonal value can likewise occur. After the copying process, the exposed printing plate is then likewise developed in a developing station.

Calibrations, i.e. settings and checks of the optimum process parameters, corresponding to two sub-processes must thus be undertaken in the traditional manufacture of a printing plate.

The traditional calibration of the first sub-process, namely the point-by-point and line-by-line film exposure in an exposure and the film developing in a developing station, occurs, for example, with the assistance of graduated standardized step wedges that are exposed on the film and co-developed, and via the measurement of the full-tine densities. A constant monitoring of the stability of exposure and development is also involved in practice with the known means. For this reason, adhering to a stable work process has previously occured indirectly by monitoring and by controlling or, setting suitable process parameters such as the intensity of the exposure beam and/or the correction curve in the exposer as well as the development temperature and/or the regeneration rates in the developing station.

The traditional calibration of the second sub-process, namely the image-wise exposure of the printing plate in a copier device and the development of the exposed printing plate in a developing station, often occurs according to the micro-line method with the assistance of precision measuring strips, for example with the FOGRA precision measuring strip PMS-I or the UGRA Offset Test Wedge 1982. These precision measuring strips are described in detail in, for example, the "Fogra Praxis Report" No. 34, 1990, Fogra-PMS-I and UGRA-Offset-Testkeil 1982 (FOGRA=Deutsche Forschungsgesellschaft für Druck- und Reproduktionstechnik e.V.).

DE-A-23 56 325 discloses a test film that is copied onto a printing plate in a copier device together with the master in order to generate a control image for visual monitoring of the following development process. The test film comprises fine signal elements in the form of finely structured zones and coarse signal elements in the form of a coarsely structure background zone that surrounds the finely structured zones and separates them from one another. The zones are respectively composed of a plurality of points. The finely structured zones are of such a nature that a modification of the process conditions leads to a visible change in their optical density, whereas the optical density of the coarsely structured background zone changes only slightly given modification of the process conditions, modifications in the process conditions being thus visually displayed.

A constant monitoring of the stability of the copying process and development of the printing plate is likewise also involved in practice with the known means. For this reason, adherence to a stable work process has also previously occurred indirectly by monitoring and by controlling or, setting suitable process parameters such as, for example, the exposure duration or, the numbers of clocks and the duration of the vacuum suctioning of the printing plate in the image-wise exposures in the copying device as well as the development temperature or the regeneration rates in the developing station. For reasons of expense, these process parameters are often only checked at greater time intervals, usually in conjunction with new batches of material.

There is currently a trend in reproduction technology to not produce the printing plates in two sub-processes via the intermediate medium of film, but to directly expose them in an exposer (computer-to-plate). Since the calibration and control methods with the assistance of the known process control strips are based on the intermediate medium of film, they cannot be applied in the direct exposure of printing plates in an exposure. Over and above this, the calibration and control methods implemented with the known process control strips have the disadvantage that they require measuring aids and practically do not allow a simple, continuous process monitoring.

SUMMARY OF THE INVENTION

It is therefore object of the invention to improve a process control strip for the visual monitoring and calibration of an exposure process for a recording material, particularly for a printing plate, as well as a method for recording the process control strip such that it can also be applied in the direct exposure of printing plates in electronic recording devices and thereby enable a high-grade quality monitoring with respect to exposure and development.

According to the invention, a process control strip is provided for visual monitoring of an exposure process for recording material. Coarse signal elements having a size substantially constant given process fluctuations are provided along with fine signal elements having a size which changes given process fluctuations. A first strip extending in a direction of a greatest expanse of the process control strip and having a tonal value wedge with process-independent reference tonal values is provided as said course signal elements that change in the strip direction. A second strip is provided parallel to the first strip and having a raster with fine raster points as said fine signal elements that represent a uniform, highly processed-dependent tonal value.

The invention is described in greater detail below on the basis of FIGS. 1 through 4.

DESCRIPTION OF THE PREFERRED EMBODIMENTS

Figure 1:
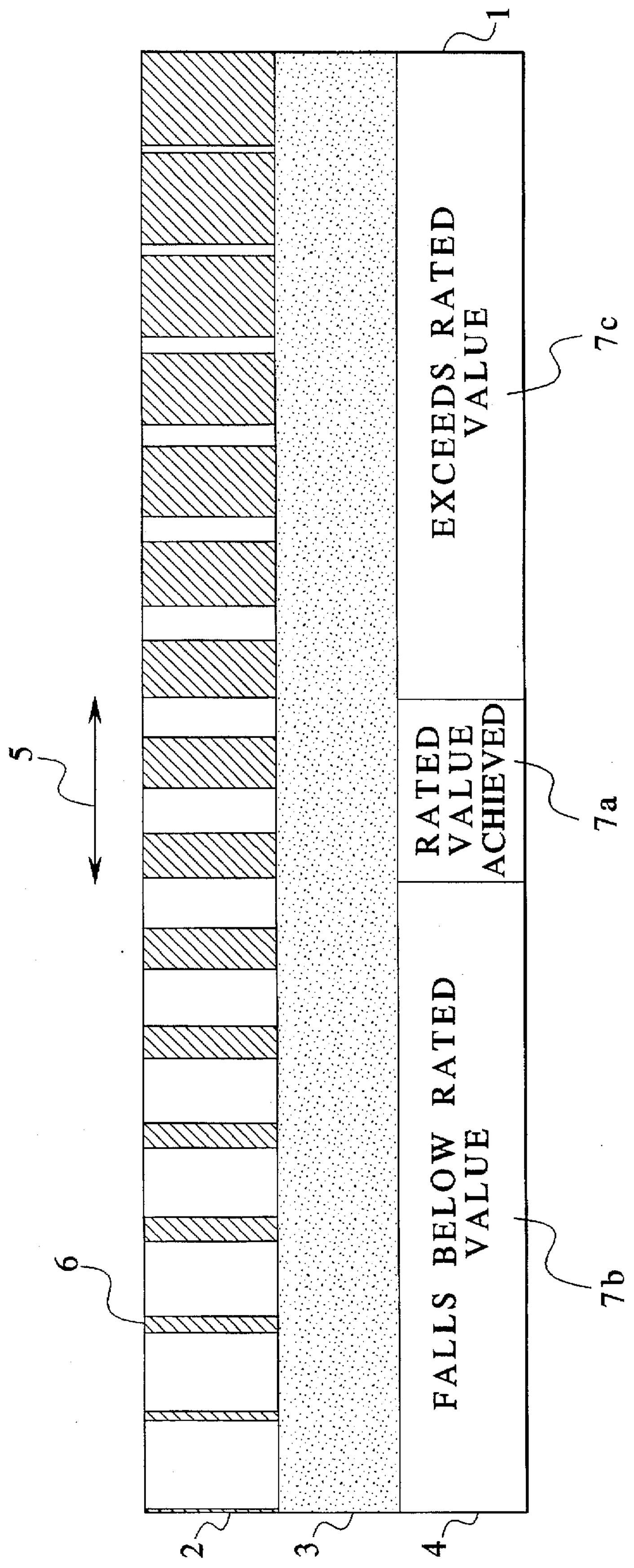
FIG. 1 is a schematic structure of a process control strip for the direct exposure of printing plates with an exposer.

FIG. 1 shows the schematic structure of a process control strip 1 for the direct exposure of printing plates with an exposure (computer-to-plate).

During the direct exposure of the printing plate in the exposer, the process control strip 1 is exposed onto the printing plate outside the printing plate region provided for the information to be exposed and is developed together with the information in a developing station. The exposed and developed process control strip 1 serves for the visual monitoring and setting of the process parameters, such as the intensity of the exposure beam as well as the development temperature and/or the regeneration rates in the developing station.

The process control strip 1 is basically composed of three stripes arranged parallel to one another that extend in the direction of the greatest expanse of the process control strip 1, namely a rated value stripe 2, an actual value stripe 3 and a display stripe 4.

In the exemplary embodiment, the rated value stripe is a graduated tonal value wedge with, for example, 16reference tonal value steps from 0% through 100%. The reference tonal values are process-independent to the farthest-reaching extent, i.e. they change only insignificantly given fluctuations of process parameters.

A rated value region 5 that contains at least one reference tonal value step as a rated value range of tolerance that is to be achieved on the printing plate in the exposure and development process can be defined within the tonal value wedge of the rated value stripe 1. The reference tonal value steps of the tonal value wedge are thereby expediently selected such that the desired rated value region 5 lies in the middle region of the process control strip 1.

Instead of a tonal value wedge with graduated reference tonal values, a tonal value wedge with continuously varying reference tonal values can also be employed.

The tonal value wedge of the rated value stripe 2 is designed as a line raster with lines 6 oriented perpendicular to the expanse of the process control strip 1 that are composed of individual pixels in the exposure. The reference tonal values of the tonal value wedge are defined by the ratio of line width to line interval of the line raster. The lines 6 of the tonal value wedge represent coarse signal elements. The size of the coarse signal elements changes only slightly, given fluctuations of the process parameters since the process-dependent changes of the pixel sizes lead to negligible changes in tonal value essentially only in the line direction at the lateral edges of the lines 6, as a result whereof the reference tonal values of the rated value stripe 2 are essentially process-independent.

The structure of the line raster of the rated value stripe 2 is limited by the resolution of the human eye and should be selected such that the integrating effect with respect to a uniform impression is not lost. A favorable value for the line spacings in the line raster lies in the range of 10 to 16 times the value of the pixel diameter that can be set by the addressing in the generation of the raster point.

The actual value stripe 3 proceeding parallel to the rated value stripe 2 is finely rastered with 333 lines/cm and represents a highly process-dependent but uniform tonal value within the actual value stripe 3. The actual value stripe 3 is composed of a plurality of fine raster points arranged in a raster, whereby each raster point within a raster mesh of the raster is composed of individual, exposed pixels in the exposure. The sum of the exposed pixel areas or, raster point sizes within a raster mesh referred to the total area of the raster mesh determines the exposed tonal value. The exposed pixels or, the raster points composed of the exposed pixels within the actual value stripe 3 form fine signal elements whose size changes given fluctuations of the process parameters, as a result of which process-dependent tonal value changes arise.

In order to achieve pronounced tonal value changes, each raster point is expediently composed of a comparatively great number of the pixels available within a raster mesh of the raster, for example of 2×2 exposed pixels within a raster mesh constructed of 3×3 pixels. A process-dependent modification of pixel size thus effects a comparatively great modification of the percentage area share in the total area of a raster mesh, so that pronounced changes in tonal value within the actual value stripe 3 arise given modifications of pixel size due to fluctuations of the process parameters.

The structure of the raster in the actual value stripe 3 with respect to the size of the raster mesh, the raster point size and the raster point shape is limited by the resolution of the printing plate to be exposed and is thus dependent on the plate type and additionally is also dependent on the addressing in the raster point generation. Practical values are 3 to 5 times the addressing for the side length of a raster mesh assumed to be quadratic.

Each pixel size or, respectively, raster point size exposed on the actual value stripe 3 of the process control strip 1 thus represents a tonal value achieved in the exposure process that coincides with a reference tonal value of the tonal value wedge of the rated value stripe 2.

The nominal condition for the exposure process is met when the tonal value achieved in the actual value stripe 3 falls in the defined rated value region 5 of the rated value stripe 2.

When the process parameters change, then the tonal value of the actual value stripe 3 changes, whereas the tonal values of the tonal value wedge in the rated value stripe 2 of the process control strip 1 remain practically stable. Given a change of the process parameters, the coincidence of the tonal values occurs at a different location of the process control stripe 1.

For simple visual checking of the degree or tonal value coincidence, the process control strip 1 comprises a display stripe 4 proceeding parallel to the rated value stripe 2 and the actual value stripe 3 that is subdivided into display fields 7 that are labeled with symbols and are arranged following one another in the longitudinal direction of the strip. A display field 7*a* with the label, for example, "rated value achieved" or "correct exposure" is thereby allocated to the defined rated value region 5 of the rated value stripe 2, whereas the neighboring display fields 7*b*, 7*c* are provided with the label "falls below rated value" or "too little exposure" or, "exceeds rated value" or "too much exposure". In this way, one advantageously obtains a location-dependent statement on the basis of the process control strip 1 as to whether the printing plate is correctly exposed, underexposed or overexposed.

Figure 2:
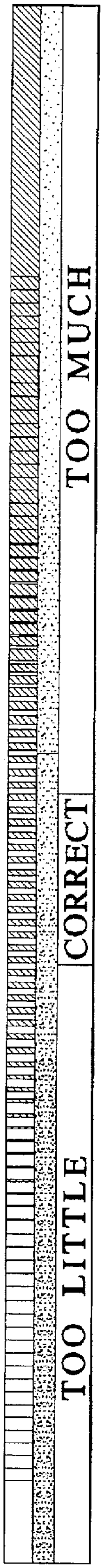
FIG. 2 is a practical exemplary embodiment of a process control strip.

FIG. 2 shows a practical exemplary embodiment for a process control strip 1 that, for example, is shown with 1000 lines/cm and was printed with 300 dpi (dpi=dot per inch)

Figure 3:
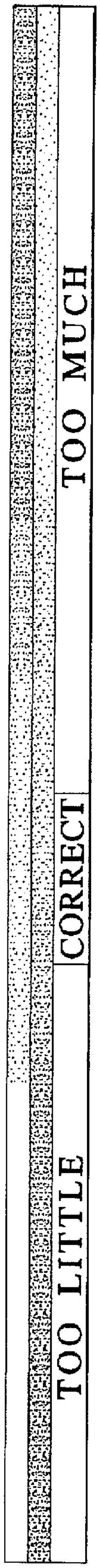
FIG. 3 is a process control strip simulated as a contone print.

FIG. 3 shows a process control strip 1 simulated as contone print. Since the reproduction of the real optical impression is not possible for reasons of printing technology, the real optical impression is simulated in FIG. 3 with a contone print of the process control strip 1.

When the calibration and monitoring method with the assistance of the process control strip 1 is used in the primary determination of the operating point, i.e. in the process calibration, then the visual tonal value comparison advantageously supplies a continuous statement about the process stability. The distance between the "coarseness" of the line raster of the tonal value wedge in the rated value stripe 2 and the "fineness" of the point raster in the actual value stripe 3 thereby defines the sensitivity of the monitoring method.

The calibration and monitoring method with the assistance of the process control strip 1 enables a high-sensitivity quality evaluation of the overall process of direct exposure and development of printing plates. In particular, the high sensitivity assures the enhanced quality demands that are present in the exposure of printing plates with frequency-modulated rasters.

Figure 4:
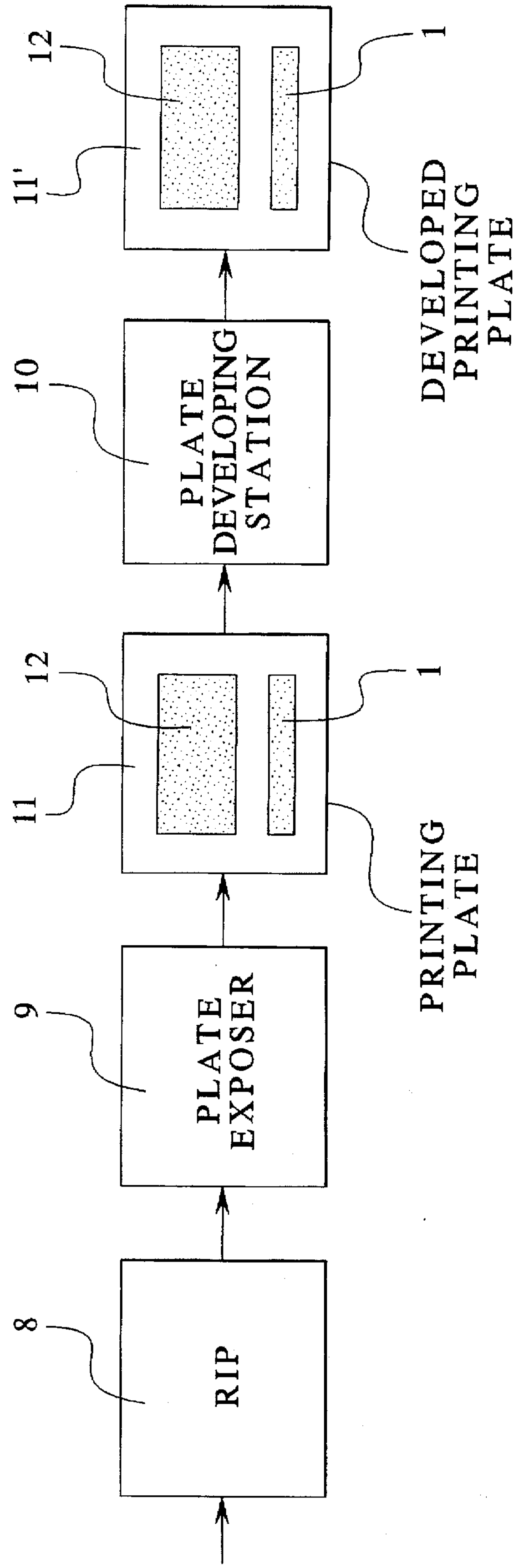
FIG. 4 is a schematic block circuit diagram of an apparatus for the direct exposure of printing plates.

FIG. 4 shows a schematic block circuit diagram of an apparatus for direct exposure of printing plates, particularly offset printing plates. The apparatus is essentially composed of a raster image processor 8, simply referred to as an RIP, of a plate exposer 9 and of a plate developing station 10.

A printing sheet to be exposed on the printing plate and the process control strip 1 to be exposed next to the printing sheet are thereby assembled, for example, in an electronic assembly station according to an imposition program. The PostScript image data thereby acquired are then converted into a display list in an interpreter contained in the raster image processor 8. In a raster generator that is likewise contained in the raster image processor, the display list is converted according to a raster function into corresponding control signal values in the form of a bitmap for the pixel-by-pixel activation and deactivation of an exposure beam generated in an exposure unit of the plate exposer 9.

The plate exposure 9 undertakes the pixel-by-pixel and line-by-line exposure of the printing plate 11. During the plate exposure, the control signal values of the bitmap determine which pixels are exposed as parts of the raster points or are not exposed on the printing plate 11. The raster function thereby determines the size of the raster points dependent on the tonal values to be recorded. The exposure beam, for example, is a laser beam that is switched on and off with a modulator controlled by the control signal values. For example, the plate exposer "Gutenberg" of Linotype-Hell AG can be utilized as plate exposer 9.

The exposed printing sheet 12 and the process control strip 1 exposed outside the printing sheet 12 are visible on the printing plate 11 exposed in the plate exposer 9. For example, a CTX printing plate of the Polychrome company can be employed as a printing plate.

The exposed printing plate 11 is developed in the plate developing station 10. The process control strip 1 on the exposed and developed printing plate 11' is then employed for visual monitoring of the exposure process and for setting the process parameters.

Although various minor changes and modifications might be proposed by those skilled in the art, it will be understood that my wish is to include within the claims of the patent warranted hereon all such changes and modifications as reasonably come within my contribution to the art.

I claim as my invention:

1. A system for visual monitoring of an exposure process for a recording material, comprising:
   - a process control strip having coarse signal elements having a size substantially constant given process fluctuations, and fine signal elements having a size which changes given process fluctuations;
   - said control strip having a first stripe extending in a direction of a greatest expanse of the process control strip and having a tonal value wedge with process-independent reference tonal values as said coarse signal elements that change in the stripe direction;
   - said control strip having a second stripe proceeding parallel to the first stripe and having a raster with fine raster points as said fine signal elements that represent a uniform, highly process-dependent tonal value; and
   - an exposer for exposing the control strip on the recording material.

2. The system according to claim 1 wherein the tonal value wedge of the first stripe is designed as a line raster.

3. The system according to claim 1 wherein lines of the line raster in the first stripe are oriented perpendicular to the stripe direction.

4. The system according to claim 1 wherein lines of the line raster in the first stripe and the raster points in the second stripe are formed of recorded pixels.

5. The system according to claim 1 wherein each raster point within a raster mesh of the raster of the second stripe is exposed from a great number of pixels available within the raster mesh.

6. The system according to claim 5, wherein each raster mesh is formed of 3×3 pixels and each raster point within the raster mesh is formed of 2×2 pixels.

7. The system according to claim 1 wherein a rated value region that comprises at least one reference tonal value desired in the exposure process is defined in the tonal value wedge of the first stripe for visual comparison to the tonal value of the second stripe achieved in the exposure process.

8. The system according to claim 1 wherein reference tonal values of the tonal value wedge in the first stripe are selected such that the defined rated value region lies in a middle region of the process control strip.

9. The system according to claim 1 further comprising a third stripe proceeding parallel to the first and second stripes for displaying a degree of tonal value coincidence between reference tonal values of the first stripe and tonal values of the second stripe achieved in the exposure process.

10. The system according to claim 9 wherein the third stripe is subdivided into display fields arranged following one another in the stripe direction that indicate with symbols a respective degree of tonal value coincidence.

11. The system according to claim 9 wherein:

a display field in the third stripe having a symbol "rated value achieved" is allocated to a defined rated value region of the first stripe; and neighboring display fields of the third stripe are provided with symbols "rated value exceeded" or "below rated value".

12. The system according to claim 1 wherein the recording material is a printing plate.

13. A method for visual monitoring of an exposure process for a recording material, comprising the steps of:

creating a process control strip having coarse signal elements having a size substantially constant given process fluctuations, and fine signal elements having a size which changes given process fluctuations;

providing the process control strip with a first stripe extending in a direction of a greatest expanse of the process control strip and having a tonal value wedge with process-independent reference tonal values as said coarse signal elements that change in the stripe direction;

providing the process control strip with the second stripe proceeding parallel to the first stripe and having a raster with fine raster points as said fine signal elements that represent the uniform, highly process-dependent tonal value;

exposing the process control strip on the recording material; and utilizing the exposed process control strip to monitor the exposure process.

14. The method according to claim 13 including the step of exposing the process control strip pixel-by-pixel and line-by-line directly on a printing plate.

15. The method according to claim 14 including the step of implementing the exposure of the process control strip simultaneously with the point-by-point and line-by-line exposure of the printing plate.

16. The method according to claim 14 including the step of generating the process control strip as Post Script data.

17. The method according to claim 14 including the step of orienting the process control strip in the point-by-point and line-by-line exposure of the printing plate such that the lines of the line raster in the first stripe proceed in the line direction.

18. A system for visual monitoring of an exposure process for a recording material, comprising:

a process control strip having coarse signal elements having a size substantially constant given process fluctuations, and fine signal elements having a size which changes given process fluctuations;

said control strip having a first stripe having a tonal value wedge with process-independent reference tonal values as said coarse signal elements that change in a direction of longitudinal extent of the first stripe;

said control strip having a second stripe proceeding parallel to the first stripe and having a raster with fine raster points as said fine signal elements that represent a substantially uniform, process-dependent tonal value; and an exposer for exposing the control strip on the recording material.

* * * * *